June 12, 1951  D. DORRIS ET AL  2,556,259

SPEED CHANGE ASSEMBLY

Filed March 30, 1949

INVENTORS
DUNCAN DORRIS
GEORGE P. DORRIS JR.

BY *Robert B. Terry*

ATTORNEY

Patented June 12, 1951

2,556,259

UNITED STATES PATENT OFFICE 2,556,259

SPEED CHANGE ASSEMBLY

Duncan Dorris, St. Louis, and George P. Dorris, Jr., Olivette, Mo.

Application March 30, 1949, Serial No. 84,394

3 Claims. (Cl. 74—411)

This invention relates to improvements in speed change assemblies, and more particularly to a shaft-supported transmission unit of improved type, for connection between a prime mover and a driven machine.

To relate the gist of the present improvements and a summary thereof, it is first noted that so-called speed reducers have heretofore been known in those types which are directly mounted upon a powered shaft of a machine to be driven therethrough, but so far as has come to the attention of these applicants, such units have heretofore been characterized by coaxial power input and power takeoff shafts, whereas the present invention is characterized by a distinctly off-axial or eccentric mutual relation between the power input and power takeoff shafts of the speed change unit, with a distinct advantage in that, when the unit derives its sole support from, as by a pendular mounting on the input shaft of a work machine, such off-axial relation of the shafts of the unit is advantageously utilized, due to the torque reaction through the unit, for the purpose of tightening a belt or chain by which the unit is usually connected to a prime mover such as an electric motor or engine.

The invention is further characterized by an improved form and arrangement of an external torque arm which, in its most advanced form, will act to establish definite limits of permissible pendular movement of the unit about the axis of the shaft which supports same, and yet which will yieldably tend to restore the unit to a predetermined position of repose best related to the desired initial belt tension.

Many advantages and points of novelty and utility will become apparent from the ensuing detailed description of a presently preferred embodiment of advanced form, particularly when considered in connection with the accompanying drawing, in which.

Figure 1:
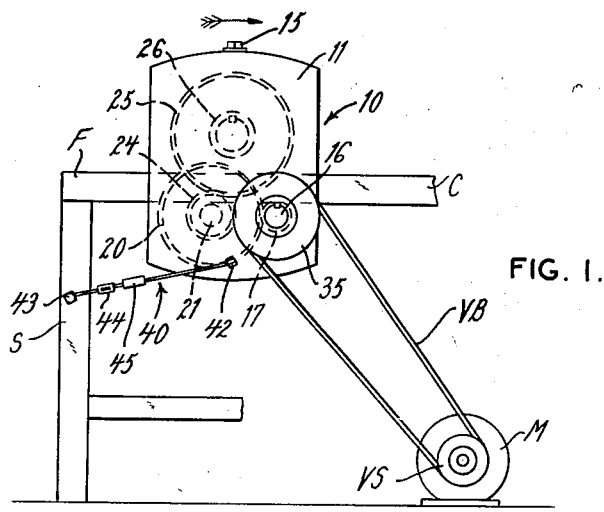
Fig. 1 is a side elevational view of an assembly consisting of a portion of a work machine or driven powered unit, together with an electric motor and a drive belt connection therefrom to a speed reducer unit, the latter appearing in front elevation.

Referring now by characters of reference to the drawing, and first to the speed change unit proper, this is exemplified in the present disclosure, but without limitation, as an enclosed shaft-supported gear type reducer which is generally designated at 10. The unit 10 includes a housing or casing element, forming also a supporting frame, and contains its own lubricant supply and oil circulating provisions not material to the present invention. The frame, housing or casing shown at 11, may include a removable closure plate (not shown) on one or both lateral faces of the unit, and which may be suitably secured to the adjacent portion of the casing as by screws or studs. Additional smaller closures may be provided for assembly of and access to certain of the shafting elements, and may similarly be detachably held in assembly. Since these are or may be conventional, they are not illustrated. A tapped filler opening 14 (Fig. 3) provides for introduction of oil as may be needed from time to time, and is closed as by a threaded plug 15.

Although the specific type and design of gearing or other transmission elements in the case, are not per se, a part of the presently claimed improvements, it may be noted for completeness that an assembly of the present type is arranged to be shaft supported, rather than base mounted, and with further reference to the disclosure, it is employed as an intermediate power transmission, between a prime mover exemplified as an electric motor M, or a suitable engine or other source of rotary power, and the work machine or driven mechanism. As illustrative of the latter there is shown a fragmentary end portion of a conveyor assembly C including a horizontal frame structure F, with supports S, and a power input shaft CS, which in the arrangement illustrated is directly driven by and serves as the sole agency for support of the reducer gear unit 10.

With further reference to the unit 10, it is noted for completeness that in the disclosure this includes an external power input shaft 16 which carries internally of the casing or housing 11, a drive pinion 17 keyed or otherwise secured to the shaft 16. Pinion 17 engages a larger gear 20 secured to an intermediate shaft 21, which latter bridges the opposite walls 22 and 23 of the case forming portions of the housing 11. The intermediate shaft 21 carries a pinion 24, which in turn is meshed with a larger gear 25 on a power output shaft 26, best seen by Fig. 3.

The power output shaft 26 of the unit 10, is in the form of a quill or hollow member, the internal diameter of which is such as to receive the shaft CS, being the power input shaft of the driven mechanism or work unit C. The relation between external diameter of shaft CS and the inside diameter identified with a bore 32 in shaft 26, is such as to result in a slip fit, permitting easy removal and replacement of the reducer unit, yet such as to assure against any gyratory or orbital movement of the unit. A suitable key 27 in a keyway 30 in shaft CS, will provide a positive driving connection between shafts 26 and CS; a set screw 31 may be utilized when desired, in order better to fix the relative axial relation between the hollow shaft 26 and the shaft CS which is telescopically received by the bore 32 of shaft 26.

Figure 3:
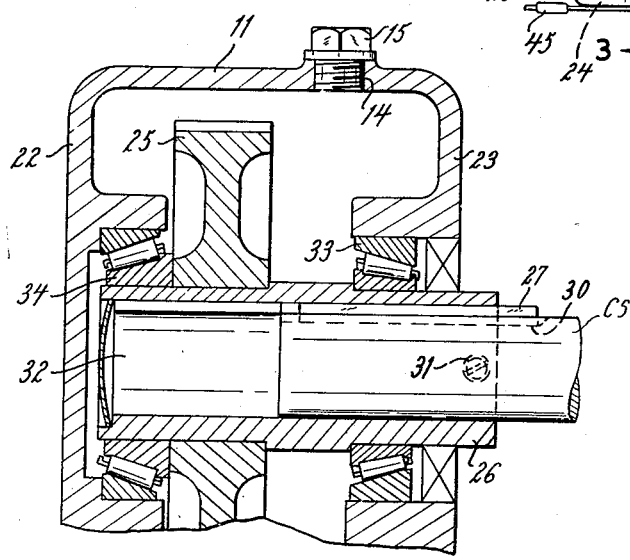
Fig. 3 is a fragmentary, greatly enlarged, sectional view taken on a vertical median plane through the reducer unit, this view being particularly located by line 3—3 of Fig. 2.

A suggested suitable arrangement of roller bearing including inner and outer races, is shown by Fig. 3, and indicated at 33 and 34. Similar bearing provisions, not detailed, may be made throughout the assembly, as for shaft 16 and the intermediate shaft 21.

Although any adaptable type of power unit may be utilized for rotation of the shaft 16, a convenient form of drive between the prime mover M and this shaft, consists of a pulley or sheave VS on the shaft of the motor M, such sheave being preferably of V groove type, and thus coacting with a multiple or single, as shown, V-belt drive, one such belt being indicated at VB, and engaging a pulley 35.

It is important to the purposes and objectives of the present improvements, that the input and output shafts of the unit 10 respectively indicated at 16 and 26, be distinctly and substantially eccentric, or otherwise expressed, located with their axes widely offset, as will readily appear from Fig. 1. It is preferred that these shafts be parallel, although they are not necessarily of the same axial extent, nor are they so shown in the present example.

The structure as thus far described is entirely operative without the addition of other parts; it has however been found advantageous in most installations of this general nature to employ some means of limiting the permissible range of swing or oscillation of the unit 10 about its axis of pendular support, this latter being identified with the coincident axes of the hollow output shaft 26 and that of shaft CS of the driven or work machine.

Figure 4:
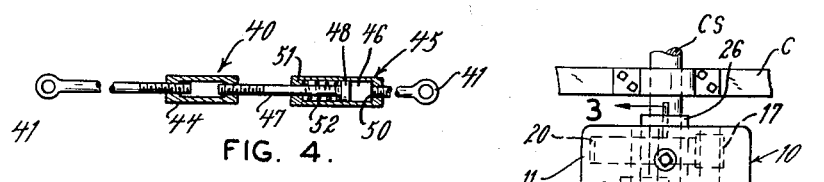
Fig. 4 is a fragmentary elevational view partly in section, showing portions of a torque arm of improved construction for use with the reducer in an assembly exemplified by Fig. 1.
Figure 2:
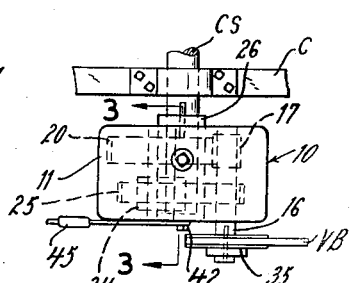
Fig. 2 is a top or plan view of a portion of the driven machine and the reducer or speed change unit with certain immediately connected elements.

Such a means is exemplified in the present disclosure by a torque arm generally indicated at 40, and a suggested location and manner of procurement of which is suggested by Fig. 1, with details of structure shown by Fig. 4. It is preferred that the member 40 be adjustable in length, and that it be provided with eye elements at its opposite ends and as indicated at 41. Through one such eye extends a headed screw or stud 42, providing by preference a swivel anchorage of this end to the case 11 of the unit, the opposite end of the arm being similarly attached as by a screw, bolt or stud 43, to some convenient stationary point of securement, for example, one of the vertical supports S of the work machine, the threaded or other element 43 being of a sufficient length for this purpose. In an intermediate portion of the torque arm, aligned sections of the rod stock form parts of the member 40 and are oppositely threaded and connected through a turnbuckle 44. It will now have become obvious that the motor M is so located as to its distance relation to the unit 10, that the V-belt for example, will be only moderately tensioned when the unit is out of operation, and that niceties of such adjustment of belt tension may be effected by adjustment of turnbuckle 44. It is preferred that, with the unit 11 at rest and inoperative, since it will thus assume a substantially vertical position as shown by Fig. 1, the motor be located with the V-belt somewhat slack, or otherwise expressed, under less tension than would normally prevail for most desirable power transmission from the motor to the unit 10. This suggestion is made in view of the possibility of some extension and contraction in the torque arm 40. In a preferred construction of the latter, one portion of the rod indicated at 45 is made tubular or hollow, and in telescoping relation within the bore 46 therein, is a headed rod section 47 the head of which is shown at 48. There are provided at the opposite ends of the bore 46, internal projections or abutments 50 and 51, and a coil compression spring 52 abutting the shoulder 51 at one end and the head 48 at the opposite end. Thus it will be seen that the torque arm is of extensible-contractible type, and while its operative length may be varied between limits, it nevertheless serves positively to limit the pendular or swinging movement of the unit 10, between the limits fixed by the length of the bore 46 and the stops 50—51 at the ends of this bore.

Although the present example is disclosed as comprising a V-belt drive between the motor and the unit 10, it should be distinctly understood that other types of belt drive such as a flat belting and pulleys therefor may be employed, or as a further possibility, among others, a chain and sprocket connection may be used between the motor and the reducer unit 10.

In the interest of optimum support of the unit 10, it is desirable first, to minimize the depth of the housing 11, so that in the case of a relatively short extension of input shaft CS, the weight of the unit may be carried as close as possible to a journalled zone of this shaft, thus minimizing shaft bending stresses. It is further desirable to provide for a minimum of overhang of the unit 10, beyond the end of shaft CS. In view of these desiderata, it is preferred that the bore 32 of shaft 26 extend substantially over the full length of the latter, and that this shaft substantially depthwise bridge the front and rear walls of the unit 10, which is of a relatively shallow proportion.

It is further desirable in the interest of providing for a vertical position of the unit when at rest, to arrange the shaft and gearing elements of the unit substantially symmetrically with respect to a vertical median plane. Although the present device departs slightly from an equal space relation between shafts 21 and 16 from the vertical median plane depthwise of the unit, such relation substantially prevails. In keeping with this design, it will be noted that the axis of the hollow take-off shaft 26 is substantially coincident with such vertical plane and that, from the whole design there results a frame or housing of vertically elongate form. Thus, between periods of operation, the pendular mounting and the location of the center of gravity substantially along the vertical median of the unit, will result in a static balance of weight of the assembly and will cause the device to assume an approximately vertical position when at rest.

Although the operation of the device will have become apparent from the foregoing description of its elements and their relation, it may be noted for completeness that optimum results are attained by rotation of the motor, hence the sprocket or sheave elements VS and 35 in such direction as to impart a counterclockwise rotation (Fig. 1) to gear 25 and the power takeoff shaft 26. From this will result a turning moment imparted to the entire unit 10, in an opposite or clockwise direction (Fig. 1) about its axis of pendular support identified with the shafts 26 and CS. It results from the distinctly offset and substantially displaced axes of the shafts 26 and 16, that a turning effect in the direction of the large arrow at the top of Fig. 1, will exert a distinct tensioning effect on the endless drive member such as a chain or the belt VB. Further, it will be observed that the greater the torque through the reduction or other speed change unit such as 10, the greater the resultant torque reaction about the axis of pendular support of the unit, thus imparting increased tension to the belt or other endless drive member as is desirable, particularly through periods of occasionally abnormal torque demands.

It will be seen that although the unit 10 connected as shown, is entirely operative to effect the noted tensioning function on the endless drive member such as VB even without the use of the torque arm 40 or equivalent stabilizing member, it is nevertheless desirable that the unit 10 be prevented from swinging about its axis of support through a range sufficient to release the pulley 35 from the endless drive member VB. This result is admirably attained by the use of a torque arm of the general nature noted.

The principle as earlier described, of utilizing, by offset input and takeoff shafts, the torque-reaction effect for purposes of controlling the tension of the belt or like endless drive member, is of course equally applicable to power transmission units of other than gear type, although these will be more often met with in the case of lightweight shaft-supported reducers.

The use herein of such terminology as pulleys, sheaves and the like, shall be taken as extending to sprockets and similar members, in case a chain drive be employed.

Although the invention has been described by particularized reference to a single advanced embodiment of the present improvements, the detail of description should be understood as illustrative rather than limiting, inasmuch as numerous variants are possible within the full intended scope of the claims hereunto appended.

We claim as our invention:

1. A speed reduction gear unit adapted for pendular support from a shaft driven thereby and including a casing substantially symmetrically formed about a vertical median plane depthwise through the unit, the unit being of a relatively shallow depth and vertically elongate, a triangular arrangement of three parallel, gear-connected shafts carried by the casing, the three said shafts including a power input shaft and an intermediate drive shaft extending depthwise of the unit with their axes substantially equidistantly located on opposite sides of said median plane, and a power takeoff shaft located in an upper region of the unit with its axis substantially coincident with said median plane, said power takeoff shaft being formed to provide a bore which is open exteriorly of the shaft, the shaft and bore extending substantially through the full depth dimension of the unit, with the bore of the takeoff shaft formed as a socket to receive in telescoping relation the input shaft of a machine to be driven by the gear unit, said takeoff shaft and input shaft of the work machine arranged in assembly to provide a common axis of pendular support of the unit about which the unit may be swingably deflected, the unit being characterized by a center of gravity substantially below the said axis of pendular support and substantially statically balanced with respect to said axis of support.

2. In a speed reducer assembly for use with a work machine having a power input shaft, and provided with a motor, a sheave on said motor and a drive belt working on the said sheave, the assembly including a triangular arrangement of parallel, gear-connected shafts and a casing or housing element therefor, said shafts including a power input shaft in said unit as an element thereof, a sheave on the power input shaft located to be engaged by said belt, a power output shaft having a bore or socket therein and adapted for telescoping engagement over the input shaft of the work machine, the hollow shaft of the unit constituting, with the input shaft of the work machine, a pendular support for the reducer unit and a fixed axis about which the unit may be swingably deflected, said hollow shaft having its axis located substantially coincidental with a vertical median plane through the reducer unit in an upper region thereof and above the center of gravity of the unit, and with the power input shaft of the reducer unit appreciably below and laterally offset from said median, the arrangement of the speed change unit with respect to its axis of support being such that a greater part of the mass of the unit lies below such axis, and further such that the unit is subjected to an arcuate swinging or pendular motion about its axis of support due to the torque reaction through the unit in one direction of rotation of its power input shaft, and a torque arm secured to a lower portion of the casing of the reduction unit in the region of one end of the arm, and secured in the region of its opposite end to a fixed anchorage, the torque arm including relatively telescoping parts, and a spring between said parts, such as to provide a predetermined limit of swing of the gear unit in either direction about its axis of support.

3. In a speed-reducer assembly for use with a work machine having a power input shaft, and provided with a motor, a sheave on said motor and a drive belt working on the said sheave, the assembly including a triangular arrangement of parallel gear-connected shafts and an enclosing casing or housing element forming a reduction unit, said shafts including a power input shaft in said unit as an element thereof, a sheave on the power input shaft to be engaged by said belt, an intermediate shaft within the unit as an element thereof, and a power output shaft substantially within the unit and having a bore therein substantially the full depth of the reducer unit, and adapted as a socket for telescoping engagement over the input shaft of the work machine, the hollow shaft of the unit constituting, with the input shaft of the work machine, a sole means of support for the reducer unit, said hollow shaft having its axis located substantially in an upper portion of the casing above the center of gravity of the unit and coincidental with a vertical median plane through the reducer unit, and with the power input shaft of the reducer unit appreciably below and laterally offset from said median, the arrangement of shafting and other elements of the speed change unit with respect to its axis of support being such that the unit is subjected to an arcuate swinging motion about its axis of support due to the torque reaction through the unit in one direction of rotation of its power input shaft, and a torque arm of extensible-contractile type secured to a lower portion of the casing of the reduction unit in the region of one end of the arm, and secured in the region of its opposite end to a fixed anchorage, the torque arm including relatively telescoping parts, and a spring between said parts, such as to provide a predetermined limit of swing of the gear unit in either direction about its axis of support, and screw thread means for adjusting the normal length of the torque arm.

DUNCAN DORRIS.
GEORGE P. DORRIS, Jr.

REFERENCES CITED

The following references are of record in the file of this patent:

UNITED STATES PATENTS

| Number | Name | Date |
|---|---|---|
| 619,421 | Johnson | Feb. 14, 1899 |
| 1,281,418 | Rathbun | Oct. 15, 1918 |
| 1,921,296 | Harkness | Aug. 8, 1933 |
| 2,116,166 | Christian | May 3, 1938 |
| 2,420,276 | Wood | May 6, 1947 |
| 2,421,822 | Wood | June 10, 1947 |
| 2,504,066 | Christian | Apr. 11, 1950 |